(12) United States Patent
Jeong et al.

(10) Patent No.: US 12,177,714 B2
(45) Date of Patent: *Dec. 24, 2024

(54) METHOD AND DEVICE FOR DATA RATE CONTROL IN NETWORK SLICE IN WIRELESS COMMUNICATION SYSTEM

(71) Applicant: Samsung Electronics Co., Ltd., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,778

(22) Filed: Sep. 27, 2023

(65) Prior Publication Data

US 2024/0031858 A1 Jan. 25, 2024

Related U.S. Application Data

(63) Continuation of application No. 17/751,042, filed on May 23, 2022, now Pat. No. 11,778,501, which is a
(Continued)

(30) Foreign Application Priority Data

Oct. 2, 2019 (KR) .................. 10-2019-0122500
Nov. 15, 2019 (KR) .................. 10-2019-0147155

(51) Int. Cl.
*H04W 28/02* (2009.01)
*H04W 76/25* (2018.01)

(52) U.S. Cl.
CPC ....... *H04W 28/0252* (2013.01); *H04W 76/25* (2018.02)

(58) Field of Classification Search
CPC ............ H04W 28/02; H04W 28/0205; H04W 28/0231; H04W 28/0236; H04W 28/0252;
(Continued)

(56) References Cited

U.S. PATENT DOCUMENTS 10,499,357 B1   12/2019   Tiwari et al.
10,506,506 B2   12/2019   Qiao et al.
(Continued)

FOREIGN PATENT DOCUMENTS

| CN | 109644133 A | 4/2019 |
| CN | 110291837 A | 9/2019 |

(Continued)

OTHER PUBLICATIONS

3rd Generation Partnership Project; Technical Specification Group Services and System Aspects; Procedures for the 5G System; Stage 2 (Release 16), 3GPP TS 23.502 V16.1.1, Jun. 11, 2019, sections 4-5.
(Continued)

*Primary Examiner* — Kevin D Mew
(74) *Attorney, Agent, or Firm* — Jefferson IP Law, LLP

(57) ABSTRACT

The disclosure relates to a method and a device for controlling a data rate in a network slice of a wireless communication system. A method for controlling a bit rate of a network slice by a session management function (SMF) device of a wireless communication system is provided. The method includes receiving a slice control policy information from a policy and charging function (PCF) device, transmitting, to a user plane function (UPF) device, a parameter for controlling each slice based on the received slice control information, and receiving, from the UPF device, a response signal for whether the transmitted parameter is acceptable.

12 Claims, 12 Drawing Sheets

Related U.S. Application Data continuation of application No. 17/032,257, filed on Sep. 25, 2020, now Pat. No. 11,343,698.

(58) Field of Classification Search
CPC ......... H04W 28/0257; H04W 28/0268; H04W 76/25

See application file for complete search history.

(56) References Cited

U.S. PATENT DOCUMENTS

| | | | |
|---|---|---|---|
| 10,645,753 | B1 | 5/2020 | Hoffner et al. |
| 2017/0332282 | A1 | 11/2017 | Dao |
| 2017/0332421 | A1 | 11/2017 | Sternberg et al. |
| 2017/0339609 | A1 | 11/2017 | Youn et al. |
| 2017/0359749 | A1 | 12/2017 | Dao |
| 2018/0192390 | A1 | 7/2018 | Li et al. |
| 2018/0227873 | A1 | 8/2018 | Vrzic et al. |
| 2018/0262924 | A1* | 9/2018 | Dao ................... H04W 24/08 |
| 2019/0053010 | A1 | 2/2019 | Edge et al. |
| 2019/0075552 | A1 | 3/2019 | Yu et al. |
| 2019/0124181 | A1 | 4/2019 | Park et al. |
| 2019/0124572 | A1 | 4/2019 | Park et al. |
| 2019/0158985 | A1* | 5/2019 | Dao ................... H04W 28/04 |
| 2019/0182875 | A1 | 6/2019 | Talebi Fard et al. |
| 2019/0191309 | A1 | 6/2019 | Kweon et al. |
| 2019/0191330 | A1 | 6/2019 | Dao et al. |
| 2019/0207778 | A1 | 7/2019 | Qiao et al. |
| 2019/0253917 | A1 | 8/2019 | Dao |
| 2019/0261260 | A1 | 8/2019 | Dao et al. |
| 2019/0297121 | A1 | 9/2019 | Qiao et al. |
| 2019/0335392 | A1 | 10/2019 | Qiao et al. |
| 2019/0394833 | A1 | 12/2019 | Talebi Fard et al. |
| 2020/0045753 | A1* | 2/2020 | Dao ................... H04W 4/08 |
| 2020/0092423 | A1 | 3/2020 | Qiao et al. |
| 2020/0092424 | A1 | 3/2020 | Qiao et al. |
| 2020/0107213 | A1 | 4/2020 | Park et al. |
| 2020/0145876 | A1 | 5/2020 | Dao et al. |
| 2020/0163140 | A1 | 5/2020 | Mochizuki et al. |
| 2020/0214054 | A1 | 7/2020 | Qiao et al. |
| 2020/0275302 | A1 | 8/2020 | Youn et al. |
| 2020/0296777 | A1 | 9/2020 | Tang |
| 2020/0322804 | A1 | 10/2020 | Vutukuri et al. |
| 2021/0029594 | A1 | 1/2021 | Kunz et al. |
| 2021/0100061 | A1* | 4/2021 | Park ................... H04W 76/27 |
| 2021/0136674 | A1* | 5/2021 | Lee ................... H04L 41/5009 |
| 2021/0153070 | A1 | 5/2021 | Velev et al. |
| 2021/0160680 | A1 | 5/2021 | Velev et al. |
| 2021/0321304 | A1 | 10/2021 | Karampatsis et al. |
| 2021/0368395 | A1* | 11/2021 | Prabhakar ........... H04W 28/24 |

FOREIGN PATENT DOCUMENTS

| | | | | |
|---|---|---|---|---|
| EP | 3846533 | A1 * | 7/2021 | ........... H04L 47/20 |
| GB | 2581392 | A * | 8/2020 | ........... H04W 12/10 |
| KR | 10-2019-0056914 | A | 5/2019 | |
| WO | WO-2018138379 | A1 * | 8/2018 | ........... H04L 29/06 |
| WO | 2020/104861 | A1 | 5/2020 | |
| WO | 2020/186145 | A1 | 9/2020 | |

OTHER PUBLICATIONS

3rd Generation Partnership Project; Technical Specification Group Services and System Aspects; System Architecture for the 5G System; Stage 2 (Release 16), 3GPP TS 23.501 V16.1.0, Jun. 11, 2019, sections 6-8.

International Search Report dated Jan. 12, 2021, issued in International Application No. PCT/KR2020/013126.

European Search Report dated Oct. 6, 2022, issued in European Application No. 20872173.8.

Chinese Office Action with English translation dated Mar. 15, 2024; Chinese Appln. No. 202080069660.9.

Extended European Search Report dated Sep. 25, 2024; European Appln. No. 24188687.8-1215 / 4426001.

Indian Office Action dated Sep. 24, 2024; Indian Appln. No. 202237019471.

* cited by examiner

METHOD AND DEVICE FOR DATA RATE CONTROL IN NETWORK SLICE IN WIRELESS COMMUNICATION SYSTEM

CROSS-REFERENCE TO RELATED APPLICATION(S)

This application is a continuation application of prior application Ser. No. 17/751,042, filed on May 23, 2022, which is a continuation application of prior application Ser. No. 17/032,257 filed on Sep. 25, 2020, which has issued as U.S. Pat. No. 11,343,698 on May 24, 2022, and is based on and claims priority under 35 U.S.C. § 119(a) of a Korean patent application number 10-2019-0122500, filed on Oct. 2, 2019, in the Korean Intellectual Property Office and of a Korean patent application number 10-2019-0147155, filed on Nov. 15, 2019, in the Korean Intellectual Property Office, the disclosure of each of which is incorporated by reference herein in its entirety.

BACKGROUND

1. Field

The disclosure relates to a method and a device for controlling a data rate in a wireless communication system. More particularly, the disclosure relates to a method and a device for controlling a data rate in a network slice of a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long term evolution (LTE) System".

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Due to the development of various IT technologies, communication equipment (network equipment) has evolved into a virtualized network function (NF, hereinafter, a "network element" can be interchangeably used) by applying a virtualization technology, and virtualized NFs may be implemented in the form of software without physical restrictions so as to be installed/operated in various types of clouds or data centers (DCs). More particularly, the NF may be freely expanded, reduced (scaled), installed, or terminated according to service requirements, system capacity, and a network load. It should be noted that, even if the NFs are implemented in the form of software, the NFs should be operated on a physical element, for example, predetermined equipment, and therefore the physical element is not excluded. The NFs may also be implemented only with a simple physical element, that is, hardware.

In order to support various services in such various network structures, a network slicing technology has been introduced. Network slicing is a technology of logically constructing a network with a set of network functions (NFs) to support specific services, and separating a slice from other slices. One terminal may access two or more slices when receiving various services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device capable of, when one network slice includes multiple network functions, adjusting a transmission rate in the network slice.

Additional aspects will be set forth in part in the description which follows and, in part, will be apparent from the description, or may be learned by practice of the presented embodiments.

In accordance with an aspect of the disclosure, a method for controlling a bit rate of a network slice by a session management function (SMF) device of a wireless communication system is provided. The method includes receiving a slice control policy information from a policy and charging function (PCF) device, transmitting, to a user plane function (UPF) device, a parameter for controlling each slice based on the received slice control information, and receiving, from the UPF device, a response signal for whether the transmitted parameter is acceptable.

In accordance with another aspect of the disclosure, an SMF device for controlling a bit rate of a network slice in a wireless communication is provided. The SMF device includes a network interface capable of communicating with at least one of network functions of the wireless communication system, a memory configured to store information for rate control of the network slice, and at least one processor, wherein the processor receives a slice control policy information from a PCF device via the network interface, transmits, to a UPF device, a parameter for controlling each slice based on the received slice control information, and receives a response signal for whether the transmitted parameter is acceptable, from the UPF device via the network interface.

According to various embodiments of the disclosure, when one network slice includes multiple network functions, a transmission rate can be efficiently adjusted in the corresponding network slice.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
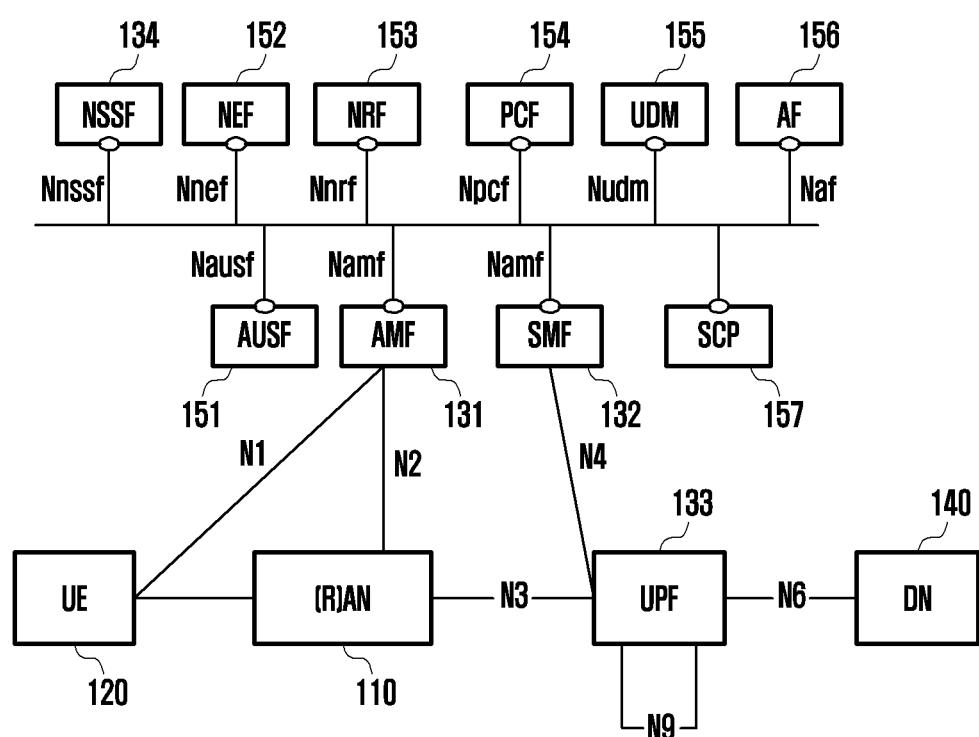
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary Accordingly, those of ordinary skill in the will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a method and a device for supporting various services in a wireless communication system. Specifically, the disclosure describes a technology for supporting various services by supporting mobility of a terminal in a wireless communication system.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in $3^{rd}$ generation partnership project long term evolution (3GPP LTE) standards for the convenience of description. However, the disclosure is not limited by these terms and names, and may be applied in the same way to systems that conform other standards.

For the convenience of description, objects to exchange information for access control and state management will be collectively referred to as NFs. An NF may be at least one device among, for example, an access and mobility management function (AMF) device, a session management function (SMF) device, and a network slice selection function (NSSF) device. However, embodiments may be equally applied even when an NF is actually implemented as an instance (each of AMF Instance, SMF Instance, NSSF Instance, and the like).

In the disclosure, a specific NF exists in the form of software codes in an instance, and the instance may refer to a state in which, in order to perform an NF function in a physical computing system, for example, a specific computing system existing on a core network, physical and/or logical resources are allocated from the computing system, and therefore the NF function can be executed. Therefore, each of an AMF instance, an SMF instance, and an NSSF instance may signify that, for AMF, SMF, and NSSF operations, physical and/or logical resources may be allocated from a specific computing system existing on a core network, so as to be used. As a result, the same operations may be performed when physical AMF, SMF, NSSF devices exist, and in the case of an AMF instance, an SMF instance, and an NSSF instance, in which physical and/or logical resources are allocated from a specific computing system existing in a core network so as to be used to perform AMF, SMF, NSSF operations.

FIG. 1 illustrates a wireless communication system according to an embodiment of the disclosure.

Referring to FIG. 1, a base station (radio access node (RAN)) 110 and a terminal (user equipment (UE)) 120 are illustrated as some of nodes using a radio channel in a wireless communication system. FIG. 1 illustrates only one base station 110 and one UE 120, but another base station that is the same as or similar to the base station 110 may be further included. In FIG. 1, a case where only one UE 120 performs communication in one base station 110 is illustrated. However, it is obvious that multiple terminals can actually perform communication in one base station 110.

The base station 110 is a network infrastructure that provides wireless access to the UE 120. The base station 110 has coverage (not illustrated in FIG. 1) defined as a predetermined geographic area based on distance over which a signal may be transmitted. The base station 110 may be referred to as an "access point (AP)", an "eNodeB (eNB)", a "5th generation (5G) node", a "wireless point", a "transmission/reception point (TRP)", or another term having an equivalent technical meaning, in addition to a base station.

The UE 120 is a device used by a user and performs communication with the base station 110 via a radio channel. In some cases, the UE 120 may be operated without user involvement. For example, the UE 120 is a device that performs machine type communication (MTC), and may not be carried by a user. The UE 120 illustrated in FIG. 1 may include at least one user portable device, and may include at least one MTC. The UE 120 of FIG. 1 may be referred to as a "terminal", a "mobile station", a "subscriber station", a "remote terminal", a "wireless terminal", a "user device", or another term having an equivalent technical meaning.

An AMF device 131 may be a network entity that performs wireless network access and mobility management for the UE 120. An SMF device 132 may be a network entity that manages connection of a packet data network for providing packet data to the UE 120. The connection between the UE 120 and the SMF device 132 may be a protocol data unit (PDU) session.

A user plane function (UPF) device 133 may be a gateway, via which a packet that is transmitted or received by the UE 120 is transferred, or a network entity that serves as a gateway. The UPF 133 may be connected to a data network (DN) 140 that is connected via the Internet, so as to provide a path for data transmission/reception between the UE 120 and the DN 140. Therefore, the UPF 133 may route data, which should be transferred via the Internet among packets transmitted by the UE 120, to an Internet data network.

The network slice selection function (NSSF) device 134 may be a network entity that performs a network selection operation described in the disclosure, for example, an operation of selecting a network slice. The operation of the NSSF device 134 will be described in the drawings to be described later.

An authentication server function (AUSF) device 151 may be equipment (network entity) that provides a service for subscriber authentication processing.

A network exposure function (NEF) device 152 may be a network entity capable of accessing information for management of the UE 120 in a 5G network, subscribing to a mobility management event of the UE, subscribing to a session management event of the UE, requesting session-related information, configuring billing information for the UE, requesting to change a PDU session policy for the UE, and transmitting small data on the UE.

A network repository function (NRF) device 153 may be a network entity (NF) having a function of storing state information of NFs and processing a request to find an NF which is accessible by other NFs.

A policy and charging function (PCF) device 154 may be a network entity that applies, to the UE 120, a service policy of a mobile communication service provider, a charging policy, and a PDU session policy.

A unified data management (UDM) device 155 may be a network entity that stores information on a subscriber and/or UE 120.

An application function (AF) device 156 may be a network entity (NF) having a function of associating with a mobile communication network so as to provide services to users.

A service communication proxy (SCP) device 157 may be a network entity (NF) having a function of NF discovery for communication between NFs, message transfer between NFs, and the like. The SCP 157 may operate in a form integrated with the NRF 153 according to selection of a business provider, and in this case, the SCP 157 may include a function of the NRF 153 or, conversely, the NRF 153 may include a function of the SCP 157.

Hereinafter, for the convenience of description, objects to exchange information for access control and state management will be collectively referred to as NFs. An NF may be at least one device among, for example, an access and mobility management function (AMF) device, a session management function (SMF) device, and a network slice selection function (NSSF) device. However, embodiments may be equally applied even when an NF is actually implemented as an instance (each of AMF Instance, SMF Instance, NSSF Instance, and the like).

In the disclosure, a specific NF exists in the form of software codes in an instance, and the instance may refer to a state in which, in order to perform an NF function in a physical computing system, for example, a specific computing system existing on a core network, physical and/or logical resources are allocated from the computing system, and therefore the NF function can be executed. Therefore, each of an AMF instance, an SMF instance, and an NSSF instance may signify that, for AMF, SMF, and NSSF operations, physical and/or logical resources may be allocated from a specific computing system existing on a core network, so as to be used. As a result, the same operations may be performed when physical AMF, SMF, NSSF devices exist, and in the case of an AMF instance, an SMF instance, and an NSSF instance, in which physical and/or logical resources are allocated from a specific computing system existing in a core network so as to be used to perform AMF, SMF, NSSF operations. Accordingly, in embodiments of the disclosure, an item described as an NF (an AMF, an SMF, a UPF, an NSSF, an NRF, an SCP, and the like) may be replaced with an NF instance or, conversely, an item described as an NF instance may be replaced with an NF. Similarly, in embodiments of the disclosure, an item described as an NW slice may be replaced with an NW slice instance or, conversely, an item described as an NW slice instance may be replaced with an NW slice.

In various embodiments of the disclosure, a data rate may be applied to downlink or uplink. If a separate bit rate value is applied to uplink/downlink, signaling may also be separately transferred. A bit rate (NW slice aggregated maximum bit rate for downlink) for a network slice in a case of downlink and a bit rate (NW slice aggregated maximum bit rate for uplink) for a network in a case of uplink may be separately configured.

Figure 2:
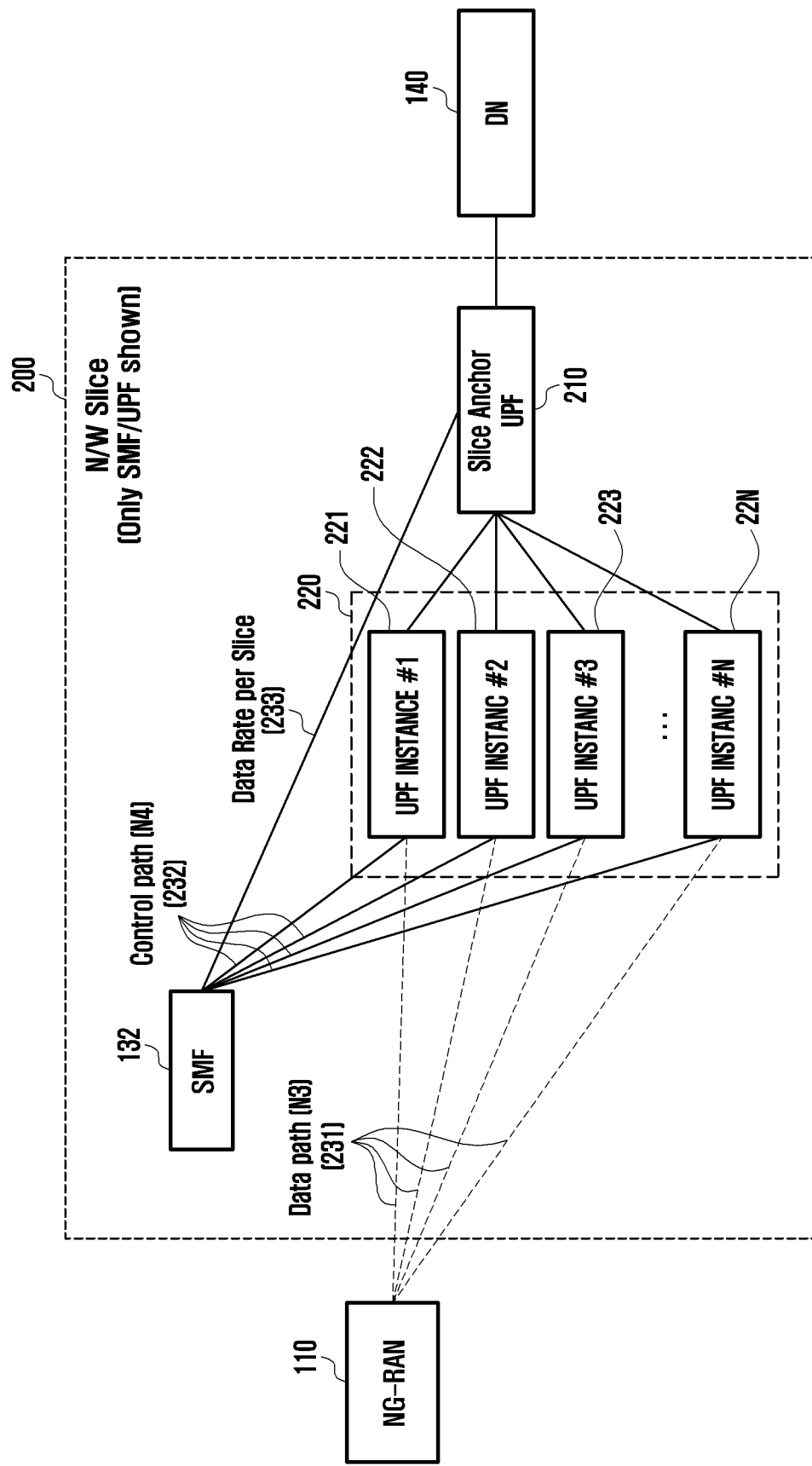
FIG. 2 illustrates a configuration of a wireless communication system according to an embodiment of the disclosure.

FIG. 2 illustrates a configuration of a wireless communication system according to an embodiment of the disclosure.

Referring to FIG. 2, a network slice 200 located between the base station 110 and the DN 140 is illustrated. The network (NW) slice 200 illustrated in FIG. 2 illustrates only the SMF 132 and UPFs 210, 220. In FIG. 2, the network slice 200 does not illustrate other NFs, but may further include other NFs (e.g., the AMF 131) in the network slice.

In addition, as illustrated in FIG. 2, one or more SMFs may be included. The configuration of FIG. 2 will be further described below.

According to various embodiments of the disclosure, the network slice 200 may be configured to have a slice anchor UPF 210 as illustrated in FIG. 2, and may include UPF instances 220. First, the slice anchor UPF 210 is an anchor UPF of the network slice, and may be referred to as a network slice anchor UPF, a slice anchor UPF, or an anchor UPF, all of which may be interpreted to have the same meaning. The slice anchor UPF 210 may control the UPF instances 220 operated for each network slice. In this way, the UPFs may be configured to have a layered structure of two or more levels in the network slice 200.

Further, according to various embodiments of the disclosure, each of N UPF instances 221, 222, 223, . . . , 22N may form a data path for transmitting/receiving data via the base station 110 and interface N3. Each of the N UPF instances 221, 222, 223, . . . , 22N may form a control path 232 via the SMF 132 and interface N4. The N UPF instances 221, 222, 223, . . . , 22N may also form a control path via the slice anchor UPF 210 and interface N4. In addition, the slice anchor UPF 210 may form a control path via the SMF 132 and interface N4. The SMF 132 may provide information for controlling a data rate 233 per network slice by using interface N4.

The slice anchor UPF 210 may form a path with the DN 140 via interface N6.

Then, an operation of controlling a data rate in units of network slices will be described based on the configurations described above. According to various embodiments of the disclosure, as described above, the UPF 133 is configured to have a layered structure of two or more levels. Accordingly, the slice anchor UPF 210 may control the UPF slices 220 which are lower layers. For example, it may be assumed that UPF instance #1 221 is a UPF instance corresponding to a first network slice, UPF instance #2 222 is a UPF instance corresponding to a second network slice, UPF instance #3 223 is a UPF instance corresponding to a third network slice, and UPF #N 22N is a UPF instance corresponding to an Nth network slice. According to various embodiments of the disclosure, it may be assumed that a user equipment is able to transmit or receive data via one or more network slices.

If the UPFs have a layered structure of two or more levels, the SMF 132 may provide a parameter (W slice aggregated maximum bit rate) for a maximum bit rate of the anchor UPF 210 or a bit rate for each of the UPF instances 221, 222, 223, . . . , 22N to the slice anchor UPF 210 via interface N4. If the SMF 132 provides a bit rate for each of the UPF instances 221, 222, 223, . . . , 22N to the slice anchor UPF 210, information (parameter) on a maximum bit rate for each of the UPF instances may be provided to the anchor UPF 210.

In this case, for example, in a case of downlink, user traffic generated in the DN 140 may be first received by the slice anchor UPF 210. The slice anchor UPF 210 having received user data from the DN 140 may determine via which network slice the user data is to be transmitted. For example, the slice anchor UPF 210 may determine whether to transmit the user data via only one network slice or via two or more network slices. Alternatively, the slice anchor UPF 210 having received user data from the DN 140 may determine a UPF instance, to which the user data is to be transmitted. In this case, the anchor UPF 210 may perform allocation so as to prevent overload or traffic congestion in a specific UPF instance, based on the maximum bit rate per UPF instance received from the SMF.

According to an embodiment of the disclosure, the slice anchor UPF 210 may allocate the user data received from the DN 140, to a UPF instance in charge of at least one network slice, based on bit rate information received from the SMF 132. As described above, when the user data is allocated to a specific UPF instance, the corresponding UPF instance may transmit the user data to the base station 110.

According to another embodiment of the disclosure, the slice anchor UPF 210 may directly transmit the user data to the base station 110 instead of the UPF instance if an additional processing operation for the user data received from the DN 140 is unnecessary.

Figure 3:
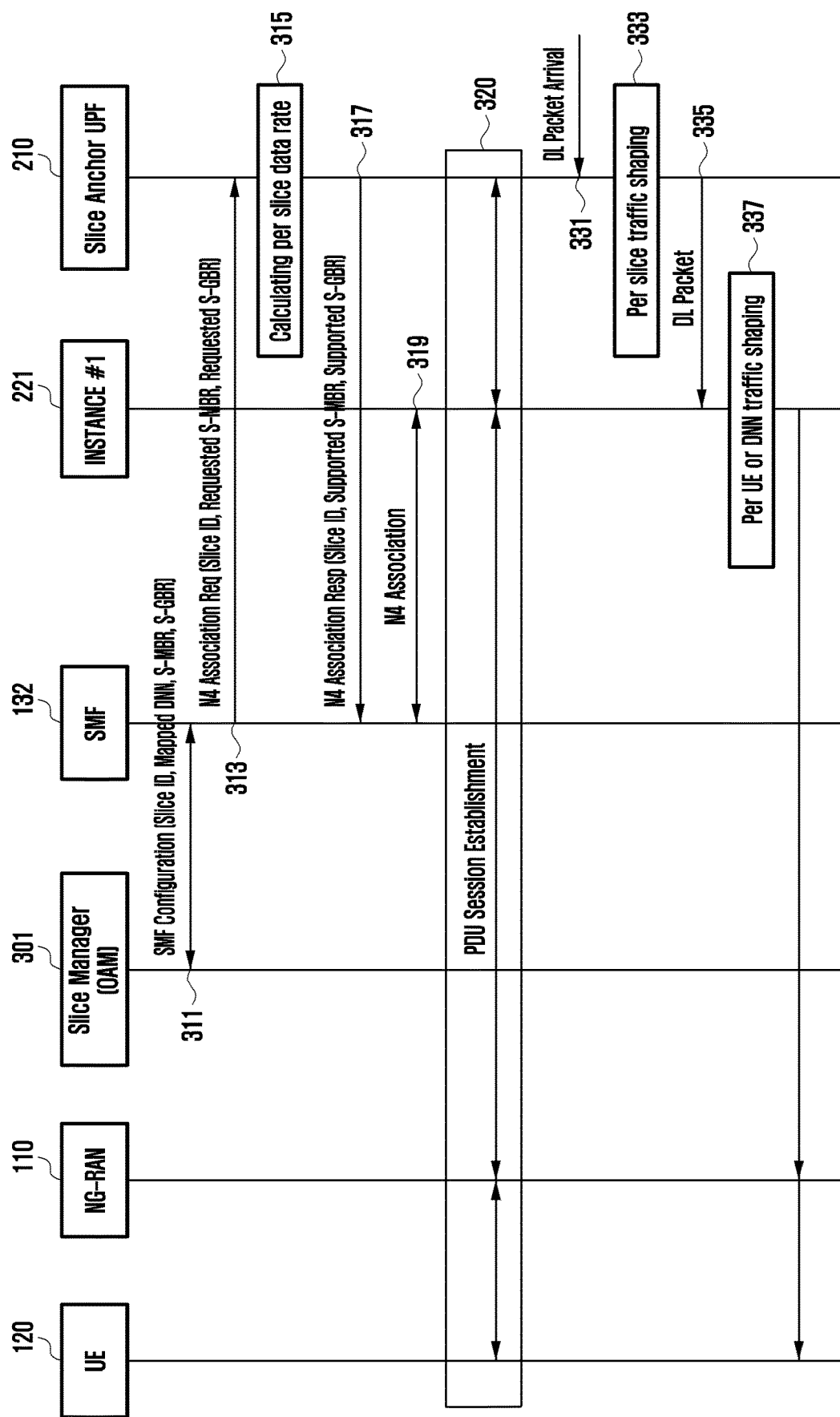
FIG. 3 is a signal flowchart for a rate control of a network slice according to an embodiment of the disclosure.

FIG. 3 is a signal flowchart for a rate control of a network slice according to an embodiment of the disclosure.

Referring to FIG. 3, an element, i.e., a network slice manager 301, may be additionally provided. The network slice manager 301 may be referred to as a "slice manager" and may include one NF. Therefore, the slice manager 301 may also be implemented as an operation & maintenance (OAM) device, as illustrated in FIG. 3.

In operation 311, the SMF 132 may receive SMF configuration information via the slice manager, for example, OAM or PCF/UDM, which is an NF that manages network slices. The SMF configuration information may include an identifier (single network slice selection assistance information (S-NSSAI)) of a slice to which the SMF 132 belongs, a data network name (DNN) mapped to the slice, and a maximum bit rate to be applied for each network slice (NW slice aggregate maximum bit rate (NS-AMBR)). This information may include information on the anchor UPF 210 for network slice rate control, for example, a network function name (NF name), an access address, and the like.

In operation 313, the SMF 132 may request establishment of N4 association, from the slice anchor UPF 210 in order to control the slice anchor UPF 210 among UPFs belonging to the network slice. This request message may include an identifier (S-NSSAI) of a network slice to be a target, a DNN mapped to the network slice, a maximum bit rate (requested NS-AMBR) in units of network slices, which is to be applied by the UPF, and a guaranteed bit rate (requested NS-GBR) in units of network slices, which is to be applied by the UPF. Here, AMBR refers to an aggregated maximum bit rate, and GBR may refer to a guaranteed bit rate.

According to an embodiment of the disclosure, an indicator indicating that a corresponding UPF, i.e., the slice anchor UPF 210, should operate as an anchor for other UPFs, for rate control of a network slice may be included. According to various embodiments of the disclosure, information (NF names, IP addresses, bit rates in units of slices for each UPF, and the like) on other UPFs, for example, the UPF instances 221, 222, 223, . . . , 22N illustrated in FIG. 2, with which the slice anchor UPF 210 should be associated may be further included.

In operation 315, the slice anchor UPF 210 may identify whether a rate in units of network slices requested by the SMF 132 can be provided, based on a maximum capacity, a current load state, states of associated UPFs, for example, the UPF instances (221, 222, 223, . . . , 22N, a configuration, and the like, of the slice anchor UPF 210 itself. If it is difficult to provide the rate in units of network slices requested by the SMF 132, the anchor UPF 210 may calculate a maximum rate that can be provided by itself.

In operation 317, the slice anchor UPF 210 may transmit an association response message in response to the N4 association request of the SMF 132. Via this association response message, the anchor UPF 210 may transmit, as a response to the SMF 132, a bit rate in units of network slices, which is supportable by the anchor UPF 210 itself. According to an embodiment of the disclosure, the association response message may include the identifier (S-NSSAI) of the network slice to be a target, the DNN mapped to the network slice, the maximum bit rate (requested NS-AMBR) in units of network slices supportable by the slice anchor UPF 210, and the guaranteed bit rate (requested NS-GBR) in units of network slices supportable by the slice anchor UPF 210.

In operation 319, if an additional UPF supporting traffic processing, routing, and the like, between the slice anchor UPF 210 and the NG-RAN 110 is necessary, the SMF 132 may select the additional UPF and may establish N4 association when necessary. With reference to FIG. 2, N4 association may be established with at least one of additional UPF instances 221, 222, 223, ..., 22N.

When a PDU session is generated between the UE 120, the NG-RAN 110, and the core network 5G core (5GC) in operation 320, the SMF 132 may perform access control based on network slice information. If it is determined that a current load state of the slice anchor UPF 133 exceeds or is highly likely to exceed the maximum bit rate in units of network slices, a request of the SMF 132 to generate a session may be rejected.

If a downlink (DL) packet is received, in operation 331, for PDU sessions belonging to the network slice, the slice anchor UPF 210 may identify in operation 333 whether bit rates (aggregated bit rate per slice) of packets, which are being processed for a specific network slice by the slice anchor UPF 210 itself, exceed the preconfigured maximum bit rate in units of network slices. If the bit rates of the packets do not exceed the configured maximum bit rate in units of network slices, the slice anchor UPF 210 may transfer the packets to the next hop in operation 335. For example, when the UPFs have a layered structure with two more levels, the next hop may be UPF instance #1 221, as illustrated in FIG. 3. According to another embodiment of the disclosure, even if the UPFs have a layered structure with two more levels, if the slice anchor UPF 210 is able to directly perform processing without separate processing, the packets may be transferred to the NG-RAN 110. According to another embodiment of the disclosure, if the bit rates of the packets exceed the configured maximum bit rate in units of network slices, the slice anchor UPF 210 may discard downlink packets.

In operation 337, UPF instance #1 221, which is a second UPF, may process the downlink (DL) packets according to UE-AMBR and session-AMBR. Subsequently, the processed downlink packets may be transmitted to the UE 120 via the base station 110.

Figure 4:
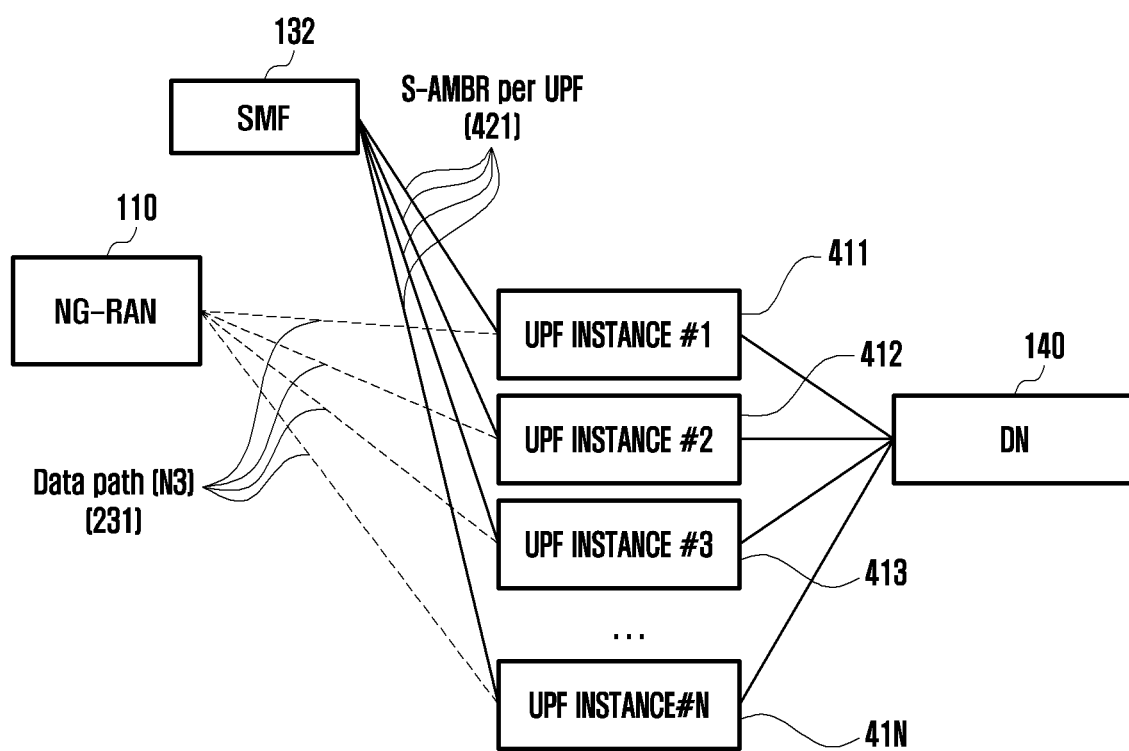
FIG. 4 is a diagram illustrating rate control operations of a slice according to an embodiment of the disclosure.

FIG. 4 is a diagram illustrating rate control operations of a slice according to an embodiment of the disclosure.

Referring to FIG. 4, when compared to FIG. 2, the slice anchor UPF is not included. Specifically, multiple UPF instances 411, 412, 413, ..., 41N may be included between the base station 110 and the DN 140. As described above, in FIG. 4, in describing a network slice, only multiple UPF instances 411, 412, 413, ..., 41N and the SMF 132 are illustrated. In FIG. 4, reference numerals different from those of FIG. 2 are used for the multiple UPF instances 411, 412, 413, ..., 41N, but this is for identification from the case of having an anchor. Therefore, the multiple UPF instances 411, 412, 413, ..., 41N illustrated in FIG. 4 may actually perform the same operations as the multiple UPF instances 211, 212, 213, ..., 21N described in FIG. 2.

According to the example of FIG. 4, the base station 110 may configure a data path 231 using interface N3 for data transmission/reception with each of the multiple UPF instances 411, 412, 413, ..., 41N. The SMF 132 may be configured by the multiple UPF instances 411, 412, 413, ..., 41N and the aforementioned interface N4. The SMF 132 may inform a maximum bit rate (S-AMBR) 421 per network slice for each UPF by using the multiple UPF instances 411, 412, 413, ..., 41N and the configured interface N4.

When downlink data to be provided to the UE is generated, the DN 140 may transmit the downlink data to a corresponding UPF instance among the multiple UPF instances 411, 412, 413, ..., 41N. The DN 140 may receive uplink user data from at least one UPF instance among the multiple UPF instances 411, 412, 413, ..., 41N.

As in the description of FIG. 2 provided above, also in FIG. 4, the SMF and the UPFs may be included in the network (NW) slice, and although not illustrated in FIG. 4, other NFs, such as an AMF, may be included.

Then, operations of FIG. 4 will be described. According to the embodiment of FIG. 4, in order to control a data rate in units of NW slices, the SMF 132 may transmit a parameter (NW slice aggregated maximum bit rate) for a maximum bit rate in units of network slices, which is to be applied by UPFs belonging to the network slice to each of UPF instances 411, 412, 413, ..., 41N, via interface N4. Based on this, each of the UPF instances 411, 412, 413, ..., 41N may adjust a data bit rate.

For example, it may be assumed that N (N is a natural number of 2 or greater) UPFs belong to one network slice, and an average load amount or a maximum capacity between the UPFs is similar or equal. In this case, if the maximum bit rate of one network slice is M, the maximum bit rate (NW slice aggregated maximum bit rate per UPF) in units of network slices, which is configured by the SMF 132 for each UPF or each UPF instance included in one network slice, may be calculated as a value obtained by dividing M by N. For example, if the maximum bit rate of one network slice is M, two UPFs or two UPF instances are included in one network slice, and the bit rate of each UPF or UPF instance is configured to be the same, the bit rate of each UPF or UPF instance may be M/2.

For another example, if a capacity/load state is different for each UPF or a separate configuration is required, the SMF 132 may calculate and configure a total sum of maximum bit rates in units of network slices distributed (allocated) to each UPF to be M.

Figure 5:
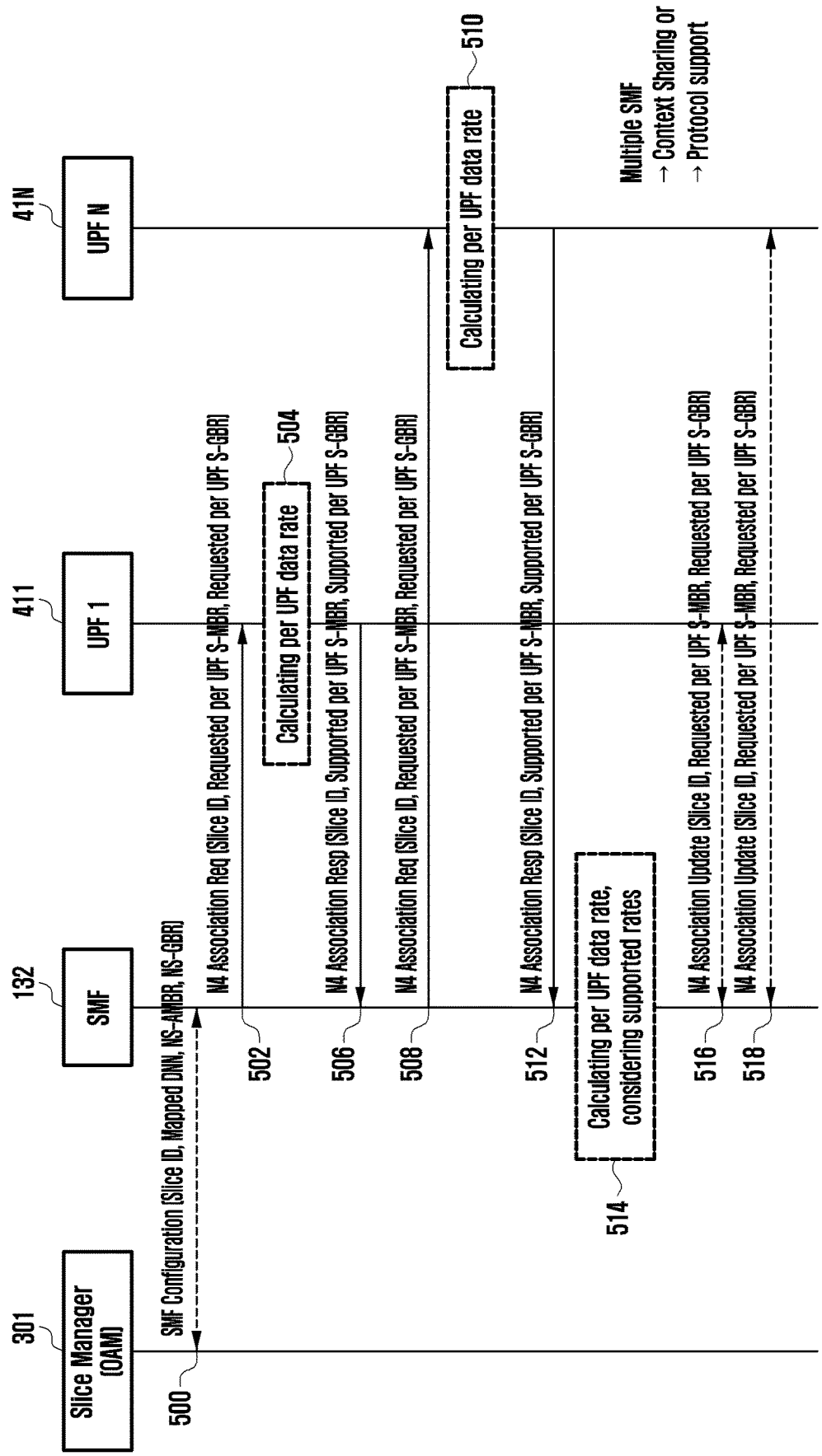
FIG. 5 is a diagram illustrating operations for applying a rate control in units of slices according to an embodiment of the disclosure.

FIG. 5 is a diagram illustrating operations for applying a rate control in units of slices according to an embodiment of the disclosure.

Referring to FIG. 5, an element, i.e., the network slice manager 301, may be additionally provided in FIG. 5, as previously described in FIG. 3. The network slice manager 301 may be referred to as a "slice manager" and may include one NF. Therefore, the slice manager 301 may also be implemented as an operation & maintenance (OAM) device, as illustrated in FIG. 3. In the following description, as described above, a UPF and a UPF instance may be interchangeable. Therefore, hereinafter, descriptions will be provided using, as examples, the UPF instances described in FIG. 4.

In operation 500, the SMF 132 may receive SMF configuration information via the UDM 155 and/or the PCF 133 or the slice manager 301 that is an NF managing a network slice. The SMF configuration information may include an identifier (S-NSSAI) of a network slice to which the SMF belongs, a data network name (DNN) mapped to the slice, and a maximum bit rate (NW slice aggregate maximum bit rate (NS-AMBR)) to be applied for each network slice.

In operation 502, the SMF 132 may request establishment of N4 association in order to control one of UPF instances belonging to the network slice, for example, a first UPF instance (UPF instance #1) 411. To this end, an N4 association establishment request message may include an identifier (S-NSSAI) of a network slice to be a target, a DNN mapped to the network slice, a maximum bit rate (requested NS-AMBR) in units of network slices, which is to be applied by the first UPF instance 411), and a guaranteed bit rate (requested NS-GBR) in units of network slices, which is to be applied by the first UPF instance 411).

In operation 504, the first UPF 411 may identify whether a bit rate in units of network slices, which is requested by the SMF 132, can be provided, based on a maximum capacity, a current load state, a configuration, and the like, of the first UPF 411 itself. If the bit rate in units of network slices, which is requested by the SMF 132, is unable to be provided, the first UPF 411 may calculate a maximum rate that can be provided by the first UPF 411 itself.

In operation 506, the first UPF 411 may transmit an N4 association response message in response to the N4 association request of the SMF 132. Via this N4 association response message, the first UPF 411 may transmit, as a response to the SMF 132, a bit rate in units of network slices, which is supportable by the first UPF 411 itself. Further, the N4 association response message may include the identifier (S-NSSAI) of the network to be the target, the DNN mapped to the network slice, the maximum bit rate (requested NS-AMBR)) in units of network slices, which is supportable by the first UPF 411, and a guaranteed bit rate (requested NS-GBR) in units of network slices, which is supportable by the first UPF 411.

Operations 508, 510, and 512 may be the same as operations 502 to 506 described above. However, there is a difference in that operations 508, 510, and 512 are performed by the SMF 132 with the Nth UPF 41N. If the first UPF 411 and the Nth UPF 41N are included in the same network slice, that is, if multiple UPFs are included in the network slice, the same content may be obtained. However, parameters used according to characteristics of the first UPF 411 and the Nth UPF 41N may be different for respective UPFs.

In operation 514, the SMF 132 may aggregate bit rates supportable in units of network slices, which are received from two or more UPFs belonging to one network slice. Thereafter, the SMF 132 may identify whether the aggregated bit rates are different from the bit rates distributed and requested by the SMF 132 itself or whether additional changes are required.

If additional configuration changes or updates in units of slices for specific UPFs are necessary, the SMF 132 may perform a procedure for updating N4 association in operations 516 and 518. A parameter to be changed may include the guaranteed bit rate (requested NS-GBR) in units of network slices, which should be supported by the UPF, and the maximum bit rate (requested NS-AMBR) in units of network slices, which should be supported by the UPF and is calculated in operation 514, and the mapped DNN and the identifier of the corresponding network slice may be transmitted together.

Figure 6:
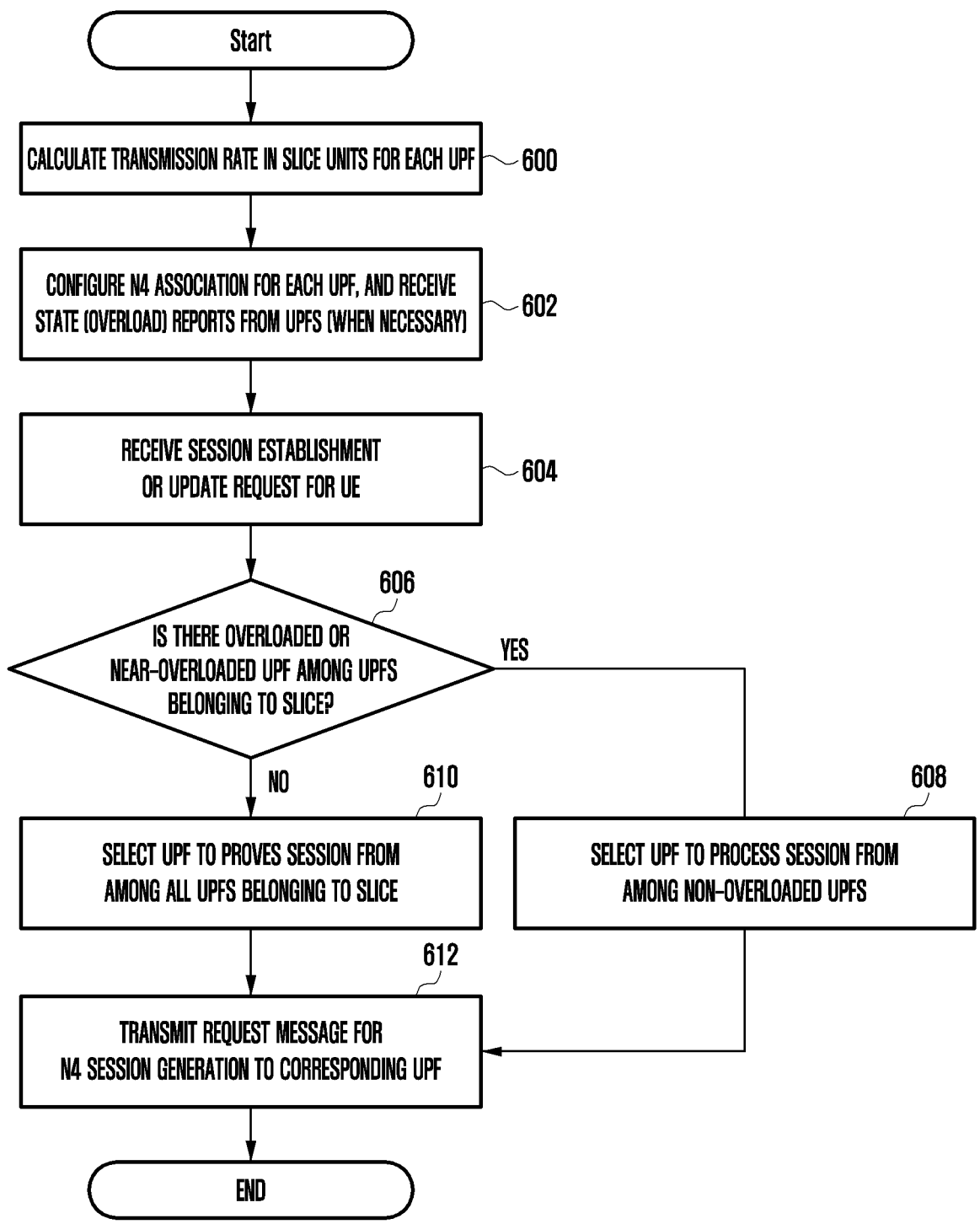
FIG. 6 is a flowchart of performing a bit rate control in units of network slices by a session management function (SMF) according to an embodiment of the disclosure.

FIG. 6 is a flowchart of performing a bit rate control in units of network slices by an SMF according to an embodiment of the disclosure.

Referring to FIG. 6, in operation 600, the SMF 132 may calculate a bit rate (NS-AMBR or NS-GBR) in units of network slices for each UPF included in one network slice.

In operation 602, the SMF 132 may configure network slice control information for each UPF via N4 association establishment and/or update. As illustrated in FIG. 5, if two or more UPFs are included in one network slice, the operation may be an operation to consider a bit rate required by each network slice and a current load state of each UPF. The SMF 132 may receive information including a load state from a specific UPF or may receive information indicating that overload has occurred. The SMF 132 may temporarily exclude an overload state or a UPF close to overload from a target during a UPF selection procedure for processing a session belonging to the network slice. If a specific UPF is in an overload state or a state close to overload and then is changed back to a normal state, the UPF recovered to the normal state may be included in a candidate set again so as to become a candidate for the UPF selection procedure for processing data in the network slice.

In operation 604, the SMF 132 may receive a session establishment request or a session update request for the UE. The session, for which the SMF 132 receives requests for session establishment and session update, may be included in the network slice.

In operation 606, the SMF 132 may identify whether there is a UPF, which is in an overload state or a state close to overload, among UPFs belonging to one network slice. As such, the UPF, which is in the overload state or the state close to overload, among the UPFs may use a preconfigured threshold value. For example, a data bit rate that can be processed by one UPF is L, wherein a threshold value may be configured to be, for example, 90% of L or 95% of L. A threshold value for each UPF may be stored in the SMF 132, may be stored in the corresponding UPF, or may be stored in both. If the UPF has a threshold value, the SMF 132 may receive a report of an overload state or a state close to overload, from at least one specific UPF. For another example, if the UPF does not have a threshold value, a load state update message may be generated so as to be reported to the SMF 132. Accordingly, the SMF 132 may identify that the UPF is close to the overload state or that the UPF is in the overload state, by using the threshold value of the corresponding UPF.

To release the overload state, a separate second threshold for releasing overload may be configured, or an overload state threshold value may be used. If the overload threshold value is used, the overload state may be identified by identifying whether the overload threshold value is exceeded. For the overload release, if the load state has a value equal to or lower than the overload state threshold value, the load state may be identified to be the overload state release. In this way, when one threshold value is used, if a load amount moves in the overload state, the overload state and the normal state (overload release state) may be repeated. Therefore, when the overload threshold value is a first threshold, a second threshold value for returning to the normal state may be separately configured. In this case, the second threshold value may generally be configured to a value lower than the first threshold value.

For example, if the first threshold value for identification of the overload state is configured to 95% of a throughput in a specific UPF, the second threshold for identification of the normal state may be configured to 90% of the throughput. It should be noted that the threshold values and examples thereof described above are provided to help understanding of the disclosure, and are not limit the disclosure.

As a result of identification in operation 606, if one or more UPFs are in the overload state or the state close to overload (Yes in operation 606), the SMF 132 may select, in operation 608, a UPF to process a session from among all UPFs belonging to the network slice, excluding the one or more UPFs.

As the result of identification in operation 606, if there is no UPF that is in the overload state or in the state close to overload (No in operation 606), the SMF 132 may select, in operation 610, a UPF to process a session from among all UPFs belonging to the network slice.

Thereafter, the SMF 132 may transmit a request message for N4 session generation to the UPF selected in operation 612.

If user traffic (user plane packet) is transmitted between UPFs or between the UPF and the NG-RAN 110, the user traffic may have to pass through multiple pieces of transmission equipment (switches or routers) in an intermediate path. NFs defined in the 3GPP standard, for example, devices (or instances), such as the UPF 133, the NG-RAN 110, the SMF 132, and AMF 151, may know information on the UE 120 and information on the network slice to which a PDU session belongs. However, the above devices, i.e., switches or routers through which the packets flows, do not actually comply with the 3GPP standard, so that information on the network slice cannot be known. There is a need for a method for applying packet processing for each network slice, such as processing a packet having a high priority, which belongs to a specific network slice, or performing urgent processing.

Figure 7:
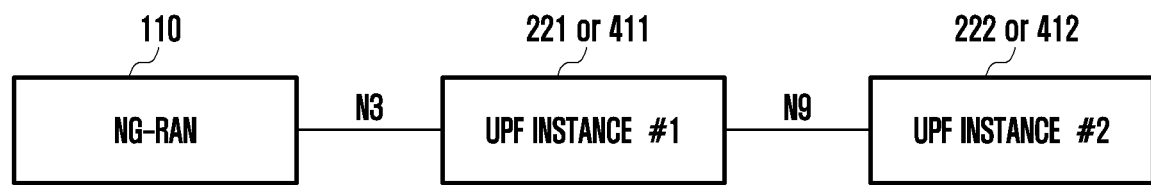
FIG. 7 is a diagram illustrating a connection between user plane functions (UPFs) or between a UPF and a next generation (NG)-radio access network (RAN) according to an embodiment of the disclosure.

FIG. 7 is a diagram illustrating a connection between UPFs or between a UPF and an NG-RAN according to an embodiment of the disclosure.

As previously described, also in descriptions of FIG. 7, a UPF or a UPF instance may be an NF or an NF device performing the same operation. In the following description, for the convenience of description, a UPF instance will be described as an example, as illustrated above. However, even in a case where a UPF is configured, contents described below are equally applicable.

Referring to FIG. 7, UPF instance #1 211, 411 and UPF instance #2 212, 412 may be connected via interface N9, as described above. In this way, connections may be made using interface N9 between UPFs, between UPF instances, or between a UPF and an UPF instance. As illustrated in FIG. 7, the NG-RAN 110 and UPF instance #1 211, 411 may be connected via interface N3. FIG. 7 illustrates the case of UPF instance #1, but the NG-RAN 110 and all UPFs or the NG-RAN 110 and all UPF instances may be connected via interface N3.

In FIG. 7, it is described that UPF instance #1 211, 411 and UPF instance #2 212, 412 are directly connected, and the NG-RAN 110 and UPF instance #1 211, 411 are directly connected. However, each of interfaces between UPF instance #1 211, 411 and UPF instance #2 212, 412 and between he NG-RAN 110 and UPF instance #1 211, 411 may include multiple transmission networks (switches or routers), and the protocol defined by 3GPP (generally, general packet radio service (GPRS) tunneling protocol (GTP-U) is used in N3/N9) may not be applied for these interfaces.

In an embodiment of the disclosure, when a packet is transmitted between a UPF and a UPF or between a UPF and an NG-RAN, an IP header may be used to include information of a network slice, to which the packet belongs, so that a switch or router is informed of the same.

The information (slice information) of the network slice, to which the packet belongs, may be one of a part of a network identifier or identifier of the network slice or a value mapped by the network slice identifier. To illustrate this, one of the following values may be used.

All S-NSSAI values
SST (Slice/Service Type)
SD (Slice Differentiator)
Mapped value When the UPFs 221, 411, and the like, described above or the NG-RAN 110 transmit a packet to the next hop (e.g., UPF or NG-RAN), network slice information may be informed of by a method of using an IP header.

IPv4: Differentiated services code point (DSCP) marking with slice information
IPv6: Flow labeling with slice information A protocol to be used in IPv4 and IPv6 may be determined by a network configuration. A switch (not illustrated in drawings) or a router (not illustrated in drawings) that has received an IP packet including the network slice information may identify the network slice to which the packet belongs, by using information included in the IP header, and a packet transmission control (rate control, priority control, path control, and the like) may be performed according to a packet processing policy for each slice, which is configured for the switch or the router.

In another embodiment of the disclosure, a GTP-U header of section N3/N9 may be used to notify of the information on the network slice to which the packet belongs. The GTP-U Header may include a service class indicator (SCI) field. When the UPF or the NG-RAN transmits the packet to the next hop (e.g., UPF or NG-RAN), the SCI field of the GTP-U header may include the network slice information (slice information or network slice information) of the embodiment. In general, a switch or router in an intermediate path does not process a GTP-U header. According to various embodiments of the disclosure, when packet processing for each slice is required, the SCI field included in the GTP-U header should be detected in an intermediate switch/router, and therefore when the GTP-U header includes slice information, the UPF or NG-RAN should process the SCI field of the GTP-U header in the IP packet header including the GTP-U packet, or may include information indicating that a packet processing function for each slice is required, as follows.

IPv4: DSCP marking with "per slice packet processing is needed" or "SCI in GTP-U header" indication
IPv6: Flow labeling with "per slice packet processing is needed" or "SCI in GTP-U header" indication When the switch or router of transmission path N3/N9 receives the IP packet and the information is configured in the IP header, the SCI field of the GTP-U header is read, the network slice to which the packet belongs may be identified, and the packet transmission control (rate control, priority control, path control, and the like) may be performed according to the packet processing policy for each slice, which is configured for the switch or the router.

Figure 8:
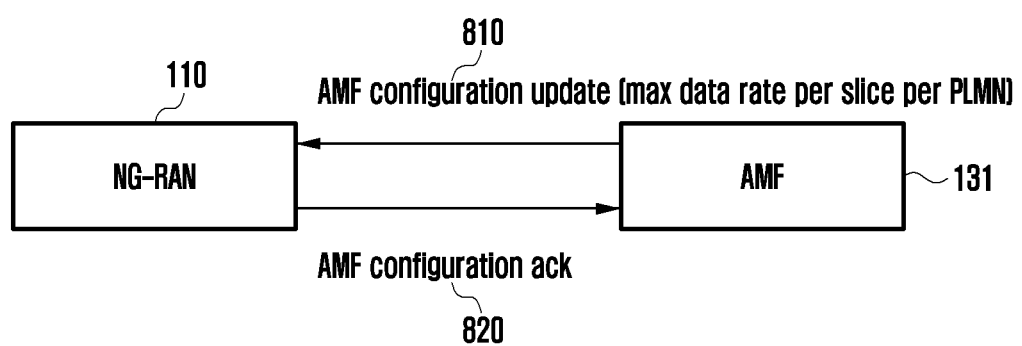
FIG. 8 is a diagram for describing a method for controlling capacity per network slice in an environment in which a RAN is shared according to an embodiment of the disclosure.

FIG. 8 is a diagram for describing a method for controlling capacity per network slice in an environment in which a RAN is shared according to an embodiment of the disclosure.

Referring to FIG. 8, in operation 810, the AMF 131 may transmit an AMF configuration update message (NG-AP) to the NG-RAN 110 in order to transfer configuration information of the AMF 131 to the NG-RAN 110. The AMF configuration update message may include a public land mobile network (PLMN) support list supported by the AMF 131. The PLMN support list may include an identifier of a network slice supported for each PLMN identifier (ID), and a list of a maximum bit rate to be applied for each network slice.

The NG-RAN 110 may receive the message and may transmit an AMF configuration acknowledgment (ACK) message indicating that the update request has been processed from the AMF 131. If an uplink packet is received from a UE or a downlink packet is received from at least one UPF included in a network slice, the NG-RAN 110 may perform control so that a maximum bit rate that is to be applied for each network slice is not exceeded.

Figure 9:
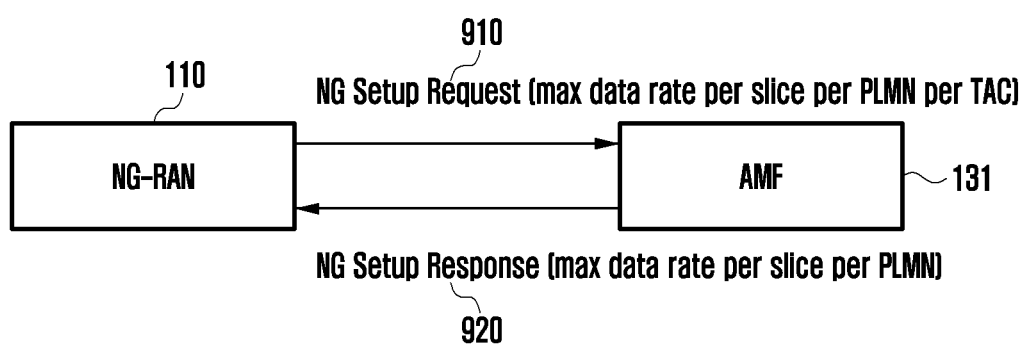
FIG. 9 is a diagram for describing a method for controlling capacity per network slice in an environment in which a RAN is shared according to an embodiment of the disclosure.

FIG. 9 is a diagram for describing a method for controlling capacity per network slice in an environment in which a RAN is shared according to an embodiment of the disclosure.

Referring to FIG. 9, in operation 910, the NG-RAN 110 may transmit an NG setup request message (NG-AP) to the AMF 131, in order to transfer its own configuration information to the AMF 131. The NG setup request message may include a PLMN support list for each tracking area code (TAC) supported by the NG-RAN 110, and the PLMN support list may include an identifier of a network slice supported for each PLMN ID, and a list of maximum bit rates to be applied for respective network slice.

The AMF 131 may store the configuration information of the NG-RAN 110, and may transmit, in operation 920, an NG setup response message (NG-AP) to the NG-RAN 110 in order to transfer the configuration information of the AMF 131 to the NG-RAN 110. The NG setup request message may include the PLMN support list supported by the AMF 131. The PLMN support list may include an identifier of the network slice supported for each PLMN ID, and a list of maximum bit rates to be applied for respective network slice. If the maximum bit rates for respective network slices, which are stored in the NG-RAN 110 show a difference, an update may be performed using values received from the AMF 131. If an uplink packet is received from a UE or a downlink packet is received from a UPF, the NG-RAN 110 may perform control so that a maximum bit rate that is to be applied for each network slice is not exceeded.

Figure 10:
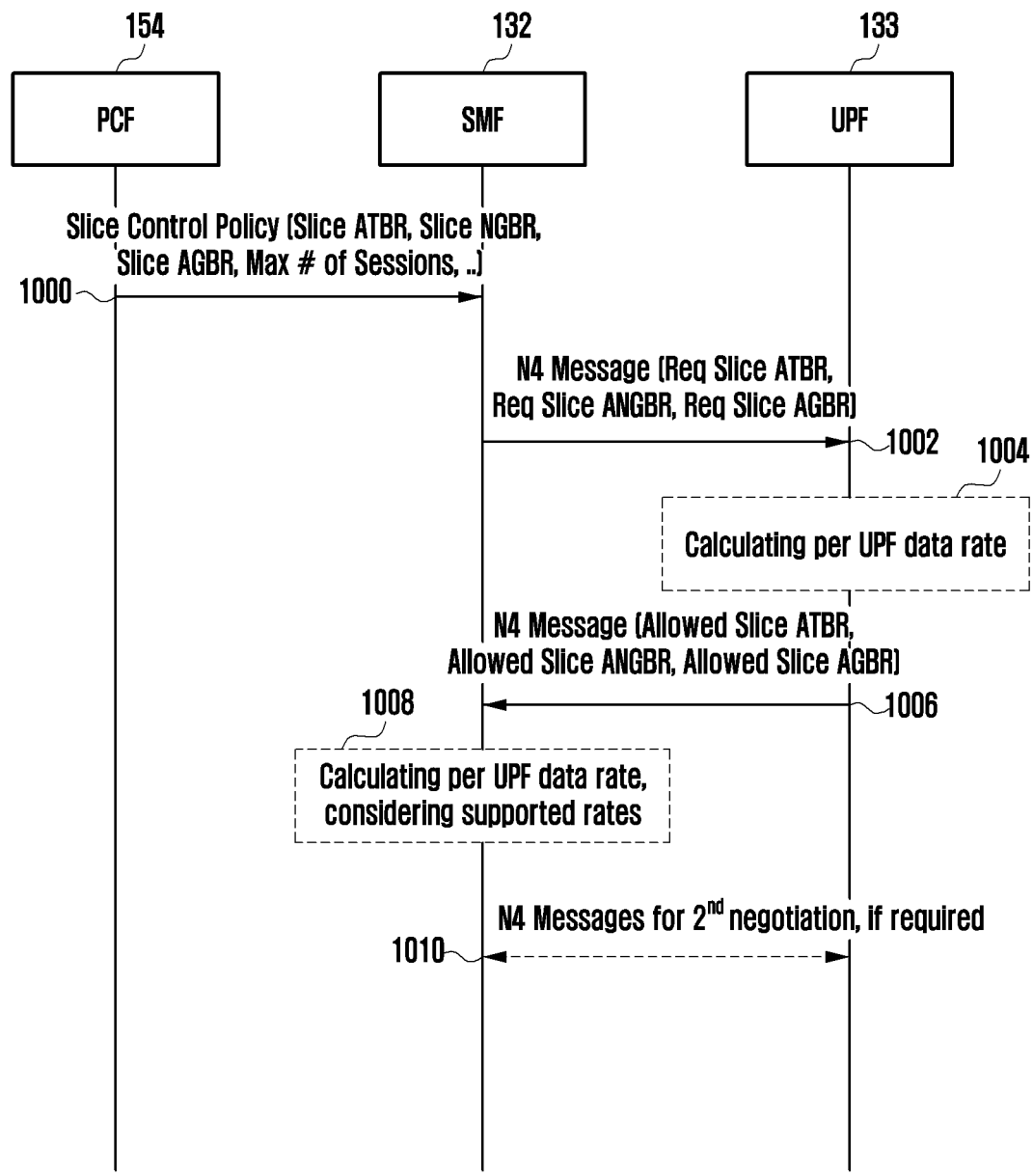
FIG. 10 is a diagram illustrating a procedure for controlling a bit rate in units of slices according to an embodiment of the disclosure.

FIG. 10 is a diagram illustrating a procedure for controlling a bit rate in units of slices according to an embodiment of the disclosure.

Referring to FIG. 10, in operation 1000, the SMF 132 may receive a policy or information for control in units of slices from the PCF 154. The policy received from the PCF 154 by the SMF 132 may be referred to as a "slice control policy", and for this, the SMF 132 and the PCF 154 may enter into an association for controlling policies in units of slices or in units of NFs. Alternatively, the SMF 132 and the PCF 154 may exchange policies in units of network slices or in units of NFs while exchanging a message for policy control for a specific subscriber/session. The corresponding policy and/or information may include an identifier (S-NSSAI, or a combination of S-NSSAI and DNN) of a slice to be a target, a maximum bit rate to be applied to the slice (slice aggregated total bit rate (slice ATBR)), a maximum bit rate for a non-GBR flow to be applied to the slice (slice aggregated non-GBR (slice ANGBR)), a maximum bit rate for a GBR flow to be applied to the slice (slice AGBR), a maximum number of PDU sessions that can be provided in the slice, and the like. Bit rate parameters for the respective various bit rates may be separately configured for each of uplink and downlink. This information may be regarded as a quota per slice, and when the information is received, the SMF 132 may perform access control and bit rate control so as not to exceed the quota for the slice. Similar to the previous embodiment of the disclosure, this information may be configured for the SMF 132 via OAM or may be configured to be received, from the UDM 155, as a part of subscription information.

In operation 1002, the SMF 132 transmits a parameter for control per slice to the UPF 133, by using message N4 that is transmitted to the UPF 133. For example, the SMF 132 may add, to message N4 to be transmitted to the UPF 133, an identifier (S-NSSAI, or a combination of S-NSSAI and DNN) of a slice to be a target, a maximum bit rate to be applied to the slice (slice aggregated total bit rate (slice ATBR)), a maximum bit rate for a non-GBR flow to be applied to the slice (slice ANGBR: slice aggregated non-GBR), a maximum bit rate for a GBR flow to be applied to the slice (slice AGBR), a maximum number of PDU sessions that can be provided in the slice, and the like. As described above, even at this time, a bit rate parameter may be separately configured for each of uplink and downlink.

In operation 1004, the UPF 133 may perform traffic enforcement by using the parameter per slice, which is received from the SMF 132. The UPF 133 may identify whether the parameter per slice, which is transmitted by the SMF 132, can be satisfied, by considering a current situation of the UPF 133 itself, for example, at least one piece of information, such as a traffic load amount, the number of sessions, and a maximum capacity configured for the UPF 133.

In operation 1006, in response to the request of the SMF 132, the UPF 133 may perform transmission using message N4, wherein whether the parameter requested by the SMF 132 is available (accepted) or unavailable may be informed of. Alternatively, if the UPF 133 is unable to provide a service with at least one of parameters requested by the SMF 132 under a condition according to the parameters, the parameter supportable by the UPF 133 may be added to message N4 together with an available parameter among the parameters requested by the SMF 132, so as to be provided to the SMF 132. The parameter supportable by the UPF 133 may include at least one in a parameter set for each slice, which is received in operation 1002, and a value of the parameter may be configured to be smaller than or equal to a requested value.

In operation 1008, the SMF 132 may identify (determine/calculate) whether the parameters requested by the SMF 132 itself, i.e., bit rates required for respective network slices, are accepted, based on message N4 received in operation 1006.

As a result of identification in operation 1008, if at least one of the parameters requested by the SMF 132 is not accepted by the UPF 133 or a newly adjusted value needs to be configured based on a parameter suggested by the UPF 133, the SMF 132 may be required to transmit a request to the UPF 133 again. Likewise, if the new SMF 132 needs to adjust at least one parameter again with the UPF 133, the SMF 132 may transmit message N4 including the parameter that needs to be adjusted to the UPF 133 again, and may perform message exchange for receiving a response. Accordingly, the SMF 132, together with the UPF 133, may finally configure parameters for bit rates for respective network slices.

In the embodiment of the disclosure, when the SMF 132 calculates or determines a bit rate for transmission to the UPF 133 via message N4, or when the UPF 133 determines a bit rate for actual enforcement by using the received transmission rate, both data transmitted on GBR quality of service (QoS) flows and data transmitted on non-GBR QoS flows may be included.

According to an embodiment of the disclosure, when the SMF 132 adds at least one of the described parameters to message N4 in order to request enforcement for providing a bit rate per network to the UPF 133, or when the UPF 133 determines a bit rate per network slice by using N4 message received from the SMF 132, a maximum data bit rate per slice may not include data transmitted on GBR QoS flows and may include only data transmitted on non-GBR QoS flows. According to another, when the UPF 133 determines a bit rate per network slice by using message N4 received from the SMF 132, both data transmitted on GBR QoS flows and data transmitted on non-GBR QoS flows may be included. For example, the data rate per network slice may include at least one among a guaranteed bit rate (GBR), a guaranteed flow bit rate (GFBR), a maximum bit rate (MBR), and a maximum flow bit rate (MFBR) for GBR QoS flow(s). The data bit rate per network slice may include an aggregate maximum bit rate (AMBR) for non-GBR QoS flow(s). The GBR, GFBR, MBR, MFBR, and AMBR may be values defined for a session or values defined for each network slice.

In another embodiment of the disclosure, for example, the data bit rate of each network slice may be implemented so that the data bit rate for GBR QoS flow(s) is not distinguished from the data bit rate for non-GBR QoS flow(s). For example, one total maximum bit rate (TMBR) including both the data bit rate for GBR QoS flow(s) and the data bit rate for non-GBR QoS flow(s) may be included.

The total slice data bit rate determined by the SMF 132 or the UPF 133 according to the scheme described above may include both the data transmitted on GBR QoS flows and the data transmitted on non-GBR QoS flows. The UPF 133 may use, as the bit rate of data transmitted on non-GBR QoS flows, a value obtained by excluding the bit rate of data transmitted on GBR QoS flows from the total network slice data bit rate. For example, if the total network slice data bit rate is 5000 Mbps and the bit rate of data transmitted on GBR QoS flows is 3500 Mbps, the bit rate of data transmitted on non-GBR QoS flows may be configured to be 1500 Mbps. The SMF 132 or UPF 133 may enforce 3500 Mbps due to the data bit rate quota of GBR QoS flows in the received (and/or determined) network slice data bit rate of 5000 Mbps, and may enforce the remaining 1500 Mbps due to the data bit rate quota of non-GBR QoS flows.

If it is necessary to lower the total network slice data bit rate, the SMF 132 or UPF 133 may preferentially lower the bit rate of data transmitted on non-GBR QoS flows. For example, if it is required to lower the total network slice data bit rate of 5000 Mbps to 4000 Mbps, the UPF 133 may change the bit rate of data transmitted on non-GBR QoS flows from 1500 Mbps to 500 Mbps without changing the bit rate, 3500 Mbps, of data transmitted on GBR QoS flows. The SMF 132 or UPF 133 may enforce 3500 Mbps due to the data bit rate quota of GBR QoS flows in the received (and/or determined) network slice data bit rate of 4000 Mbps, and may enforce the remaining 500 Mbps due to the data bit rate quota of non-GBR QoS flows.

According to another embodiment of the disclosure, the bit rate parameter per network slice, which is received from the SMF 132 by the UPF 133 according to the method provided in the previously described embodiment of the disclosure, may not include data transmitted on GBR QoS flows, and may include only data transmitted on non-GBR QoS flows.

For example, the network slice data bit rate may include the GBR, GFBR, MBR, or MFBR for GBR QoS flow(s). The network slice data bit rate may include the AMBR for non-GBR QoS flow(s). The GBR, GFBR, MBR, MFBR, or AMBR may be values defined for a session or values defined for a network slice.

For another example, in the network slice data bit rate, the data bit rate for GBR QoS flow(s) is not distinguished from the data bit rate for non-GBR QoS flow(s). For example, one total maximum bit rate (TMBR) including both the data bit rate for GBR QoS flow(s) and the data bit rate for non-GBR QoS flow(s) may be included.

According to the method described above, the SMF 132 or UPF may use a data bit rate by considering only the data transmitted on non-GBR QoS flows, wherein the data bit rate is obtained by excluding the bit rate of the data transmitted on GBR QoS flows from the network slice data bit rate including the data transmitted on GBR QoS flows and the data transmitted on non-GBR QoS flows.

To this end, if the total network slice data bit rate is 5000 Mbps and the bit rate of data transmitted on GBR QoS flows is 3500 Mbps, the SMF 132 or UPF may configure the bit rate of data transmitted on non-GBR QoS flows to be 1500 Mbps. In this case, the network slice data bit rate used by the SMF 132 or the UPF 133 may be 1500 Mbps. The UPF 133 may enforce the received (and/or determined) 1500 Mbps for the data bit rate quota of non-GBR QoS flows.

If it is necessary to lower the total network slice data bit rate, the SMF 132 or UPF 133 may preferentially lower the bit rate of data transmitted on non-GBR QoS flows. For example, if it is required to lower the total network slice data bit rate of 5000 Mbps to 4000 Mbps, the SMF 132 or the UPF 133 may change the bit rate of data transmitted on non-GBR QoS flows from 1500 Mbps to 500 Mbps without changing the bit rate, 3500 Mbps, of data transmitted on GBR QoS flows. In this case, the SMF 132 or the UPF 133 may transmit a changed data bit rate value of 500 Mbps to a base station. The base station may enforce received/determined 500 Mbps for the data bit rate quota of non-GBR QoS Flows.

In the above description, each of the data bit rates may be divided into uplink and downlink so as to be expressed as separate parameters, and enforcement using the same may be performed separately for each of the uplink and the downlink.

Figure 11:
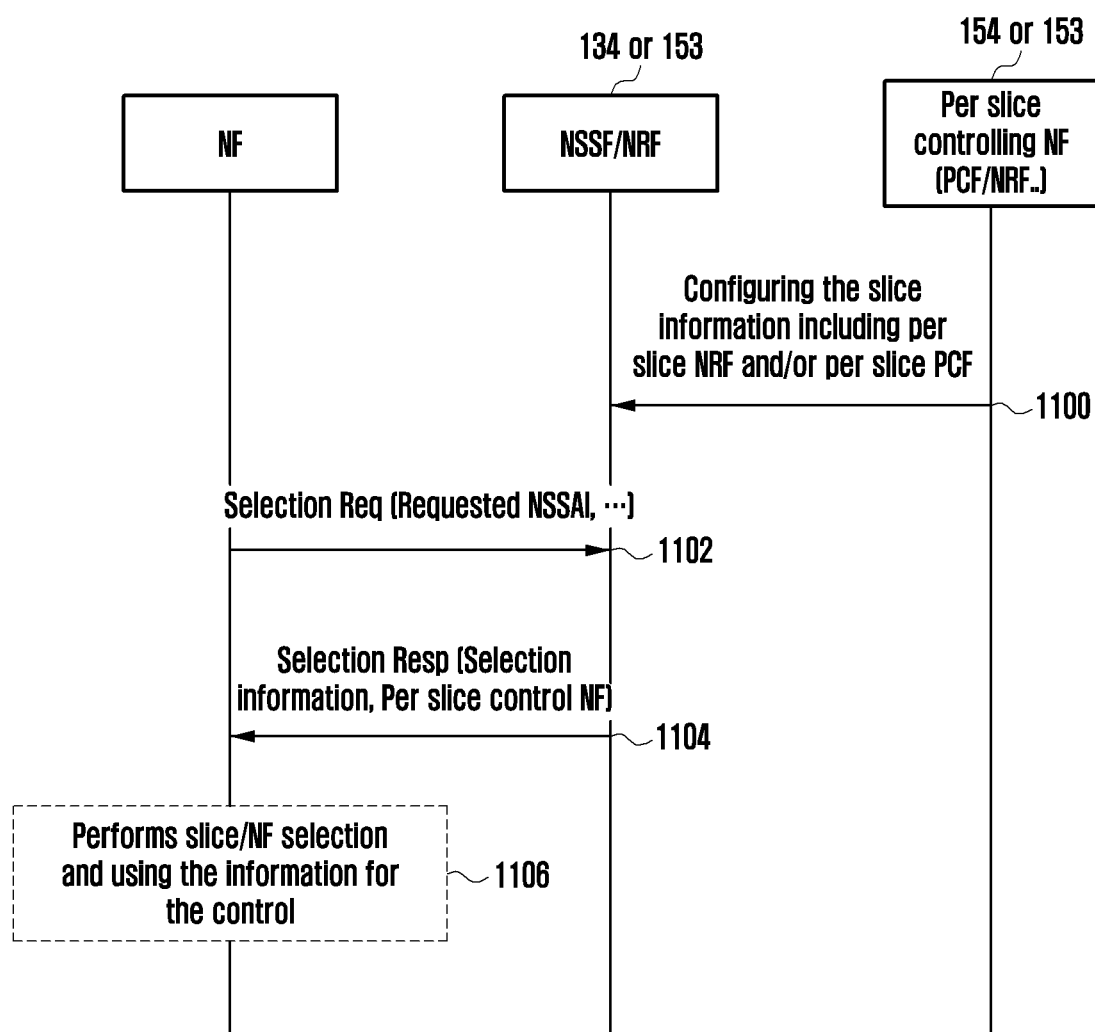
FIG. 11 a diagram illustrating a procedure of selecting a network function (NF) for a network slice control according to an embodiment of the disclosure.

FIG. 11 a diagram illustrating a procedure of selecting an NF for a network slice control according to an embodiment of the disclosure.

Referring to FIG. 11, in operation 1100, information on an NF that can support control for each network slice may be stored in the NSSF 134 or the NRF 153. The control for each network slice may be performed by storing an upper limit value for the quota configured for each network slice (S-NSSAI or a combination of S-NSSAI and DNN), and comparing values obtained by calculating information on each network slice, which is collected from an NF belonging to the network slice. The NF belonging to the network slice may include other types of NF in addition to AMF, SMF, and UPF, and an NF that can support control for each slice may include PCF, NRF, NSSF, UDM, or other types of NF.

The quota configured for each network slice (S-NSSAI or a combination of S-NSSAI and DNN) may include, for example, at least one of a maximum number of concurrently connected UEs, a maximum number of concurrently supported sessions, and the bit rate described in the previous embodiment. State information for each network slice may be collected from NFs to which respective network slices belong. When collected information is described as an example, the collected information may be the number of currently connected UEs and/or the number of PDU sessions.

Accordingly, the NF that can support control for each network slice may determine, when control is performed for each network slice, a state of the slice based on the quota, that is pre-stored information, and information for each network slice, which is collected from each NF. For example, if the quota configured for one specific network slice is the maximum number of concurrently supported sessions, the NF that can support control for each network slice may perform comparison by using the total number of currently connected sessions collected from other NFs with respect to the corresponding network slice. Based on the comparison, the NF that can support control for each network slice may identify whether information collected for a specific network slice has reached an upper limit of the quota (whether a configured threshold value has been reached). The configured threshold value may be a value smaller than or equal to the quota.

Here, the NF that can support control for each network slice may be an NF capable of transmitting the collected information to another NF. The NF may include, for example, an NF, such as the NRF 153 (used during an NF selection procedure based on quota in units of network slices), the PCF 153 (during a policy configuration procedure based on the quota in units of network slices), and the UDM 155.

Whether a specific NF supports the control for the specific network slice may be configured via OAM, may be registered, including whether the control for the specific network slice (S-NSSAI or NSSAI) is supported, in a profile of the NF, or may be registered including whether the control for the specific slice is supported and network slice availability information supported by the NF. It should be noted that, in the embodiment of FIG. 11, performing storage operations and transmitting a response message to the above message by the NF (NRF 153/NSSF 134) are omitted.

In operation 1102, a consumer NF, for example, the AMF 131, the SMF 132, and the like, may transmit, to the NSSF 134 or NRF 153, a request for receiving information for selection of a network slice (or an NF included in the slice). This message may include an identifier (S-NSSAI or NSSAI) of a network slice to be a target.

In operation 1104, when information necessary for responding to the request message received in operation 1102 is stored, the NSSF 134 or NRF 153 may transmit a response message including information for selection of the network slice (or the NF included in the slice). If the NSSF 134 or the NRF 153 needs to control the requested slice by using the described quota and to use a specific NF for the control, information related thereto may be included in the response message so as to be transmitted. For example, the response message may include information (at least one of a name, an address, an identifier, and a type of NF) of an NF, for example, the NRF 153, PCF 154, and the like, which supports network slice unit control (per slice control).

In operation 1106, the consumer NF may store information received via the response message in operation 1104, and thereafter, by using the stored information, the consumer NF may select a network slice, may perform NF selection and UE registration, may perform PDU session processing, and/or may control a data bit rate. As described above, the consumer NF in the disclosure may refer to an NF that uses a service provided by another NF. For example, in the relationship between two NFs, in general, the consumer NF may refer to an NF that transmits a request for a service.

Figure 12:
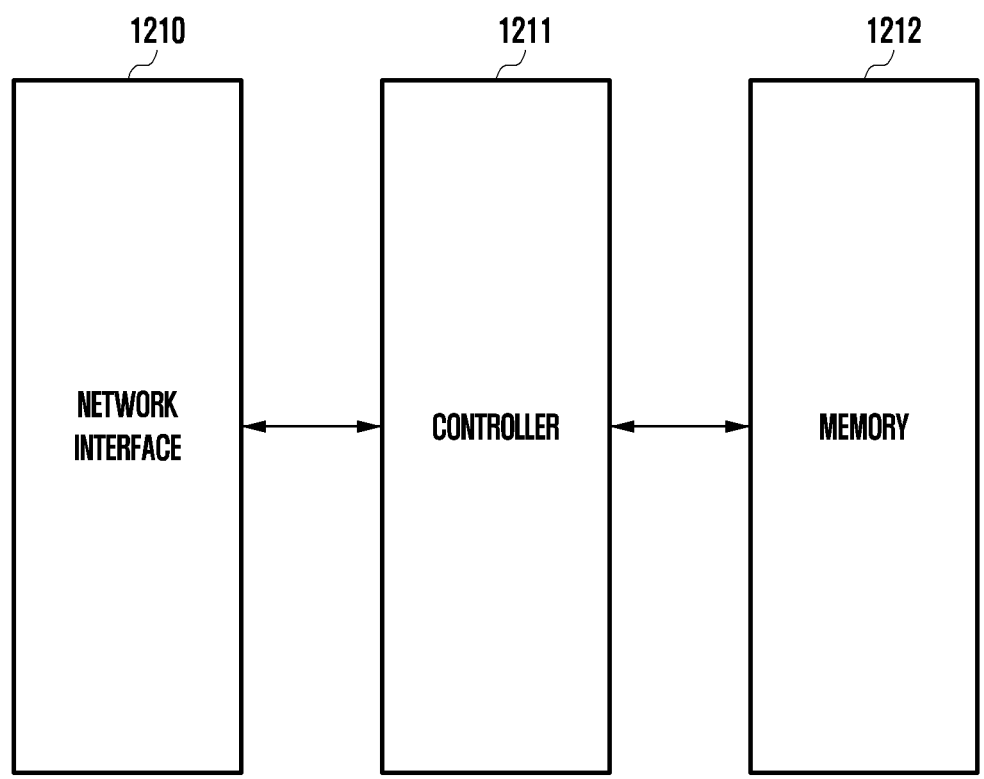
FIG. 12 is an internal function block diagram of an NF according to an embodiment of the disclosure.

FIG. 12 is an internal function block diagram of an NF to which the disclosure may be applied according to an embodiment of the disclosure.

Prior to describing FIG. 12, as described above, an NF may correspond to one of the AMF 131, the SMF 132, the UPF 133, the NSSF 134, the NRF 135, the PCF 154, and the UDM 155, may include a form in which at least one thereof is combined, or may correspond to an NF capable of performing the function described above.

Referring to FIG. 12, the network interface 1210 may communicate with another network entity of a core network. For example, if the NF is the AMF 131, a network interface 1210 may provide an interface for communication with the SMF 132, the UPF 133, the NSSF 134, the NFR 153, and/or the SCP 157. For another example, if the NF is the SMF 132, the network interface 1210 may provide an interface for communication with the AMF 131, the UPF 133, the NSSF 134, the NFR 153, and/or the SCP 157. In another case, if the NF is a UPF 133, 210, 221, 222, 223, 22N, 411, 412, 413, or 41N, the network interface 1210 may provide an interface for communication with the AMF 131, another UPF, the SMF 132, the NFR 153, and/or the SCP 157. Such an interface may include the aforementioned interface N3 and interface N4. Similarly, if the NF is one specific network entity, an interface for communication with other entities in the core network may be provided.

A controller 1211 may be implemented as at least one processor and/or program for performing operations of the NF. For example, if the NF is the AMF 131, the controller 1211 may perform the operations of the AMF 131 described above. For another example, if the NF is the SMF 132, the controller 1211 may perform the operations of the SMF 132 described above. In the case of other network entities, controls necessary for the above-described operations may be performed in the same manner.

A memory 1212 may store a program and various types of control information required by the controller 1211, and may further store respective pieces of information described in the disclosure. For example, if the NF is the AMF 131, the memory 1212 may store information received from the AMF 131 or information received from an external entity. For another example, if the NF is the SMF 132, the memory 1212 may store received information and/or control information required by the SMF 132. In the case of other network entities, information necessary for the operations described above may be stored in the same manner.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette.

Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. A method for controlling a bit rate of a network slice performed by a first network function (NF) of a wireless communication system, the method comprising:
   obtaining information on a maximum allowed data rate for the network slice;
   identifying whether a data rate associated with the network slice exceeds the maximum allowed data rate for the network slice; and
   transmitting, to a second NF, a response indicating rejection based on the data rate associated with the network slice and the maximum allowed data rate.

2. The method of claim 1, wherein the maximum allowed data rate comprises a maximum bit rate for a non-guaranteed bit rate (GBR) flow for the network slice, and a maximum bit rate for a GBR flow for the network slice.

3. The method of claim 1, wherein the maximum allowed data rate is configured separately for uplink and downlink.

4. The method of claim 1, further comprising:
   obtaining a single network slice selection assistance information (S-NSSAI),
   wherein the network slice is identified by the S-NSSAI.

5. The method of claim 1, wherein the data rate exceeds the maximum allowed data rate.

6. The method of claim 1, wherein, the response further comprises information on an acceptable data rate.

7. A first network function (NF) for controlling a bit rate of a network slice in a wireless communication system, the first NF comprising:
   a network interface for communicating with at least one of network functions of the wireless communication system;
   a memory configured to store information for bit rate control of the network slice; and
   at least one processor configured to:
      obtain information on a maximum allowed data rate for the network slice,
      identify whether a data rate associated with the network slice exceeds the maximum allowed data rate for the network slice, and
      transmit, to a second NF, a response indicating rejection based on the data rate associated with the network slice and the maximum allowed data rate.

8. The first NF of claim 7, wherein the maximum allowed data rate comprises a maximum bit rate for a non-guaranteed bit rate (GBR) flow for the network slice, and a maximum bit rate for a GBR flow for the network slice.

9. The first NF of claim 7, wherein the maximum allowed data rate is configured separately for uplink and downlink.

10. The first NF of claim 7,
    wherein the at least one processor is further configured to obtain a single network slice selection assistance information (S-NSSAI), and
    wherein the network slice is identified by the S-NSSAI.

11. The first NF of claim 7, wherein the data rate exceeds the maximum allowed data rate.

12. The first NF of claim 7, wherein the response further comprises information on an acceptable data rate.

* * * * *